US008455074B2

(12) United States Patent
Emmert

(10) Patent No.: US 8,455,074 B2
(45) Date of Patent: Jun. 4, 2013

(54) FORMS CONTAINING A REMOVABLE HANG TAG

(75) Inventor: David R. Emmert, Angola, IN (US)

(73) Assignee: Moore Wallace North America, Inc, Stamford, CT (US)

( * ) Notice: Subject to any disclaimer, the term of this patent is extended or adjusted under 35 U.S.C. 154(b) by 301 days.

(21) Appl. No.: 12/839,242

(22) Filed: Jul. 19, 2010

(65) Prior Publication Data

US 2012/0015128 A1 Jan. 19, 2012

(51) Int. Cl.

| | |
|---|---|
| ***B32B 9/00*** | (2006.01) |
| ***B65D 65/28*** | (2006.01) |
| ***B42D 15/00*** | (2006.01) |
| ***G09F 1/04*** | (2006.01) |
| ***G09F 21/04*** | (2006.01) |

(52) U.S. Cl.

USPC ....... 428/40.1; 428/42.1; 428/42.2; 428/42.3; 428/43; 283/72; 283/94; 283/99; 283/106; 40/124.01; 40/124.09; 40/124.11; 40/299.01; 40/643; 40/672; 40/673

(58) Field of Classification Search

USPC ................ 428/40.1, 42.1–43; 283/72, 81, 94, 283/99, 106; 40/124.01, 124.09, 124.11, 40/299.01, 643, 672–675

See application file for complete search history.

(56) References Cited

U.S. PATENT DOCUMENTS

| | | | | |
|---|---|---|---|---|
| 4,846,501 | A | 7/1989 | Del Grande | |
| 4,940,690 | A | 7/1990 | Skees | |
| 5,766,705 | A * | 6/1998 | O'Brien et al. | 428/34.9 |
| 5,893,512 | A | 4/1999 | Diedrich | |
| 6,003,760 | A | 12/1999 | Abercrombie | |
| 6,015,085 | A | 1/2000 | Cannot et al. | |
| 6,092,843 | A | 7/2000 | Peterson et al. | |
| 6,197,396 | B1 * | 3/2001 | Haas et al. | 428/40.1 |
| 6,948,742 | B2 | 9/2005 | Buck | |
| 2003/0067159 | A1 | 4/2003 | Ritchie et al. | |
| 2004/0074128 | A1 | 4/2004 | Best et al. | |
| 2004/0154195 | A1 | 8/2004 | Jewell et al. | |
| 2005/0252954 | A1 | 11/2005 | Buck | |
| 2006/0117631 | A1 | 6/2006 | Lewis | |

* cited by examiner

*Primary Examiner* — Patricia Nordmeyer

(74) *Attorney, Agent, or Firm* — Hanley, Flight and Zimmerman, LLC

(57) ABSTRACT

Forms containing a removable hang tag are disclosed. An example form includes a substrate including a first line of weakness defining a central area and a perimeter area. The form includes a second line of weakness in the central area to divide the central area into a first side and a second side. The form includes a third line of weakness formed in the perimeter area to define a sleeve area. The form includes a fourth line of weakness formed in the sleeve area to divide the sleeve area into a first sleeve layer and a second sleeve layer.

32 Claims, 6 Drawing Sheets

FORMS CONTAINING A REMOVABLE HANG TAG

FIELD OF THE DISCLOSURE

The present disclosure relates generally to forms and, more particularly, to forms having a removable hang tag.

BACKGROUND

In the manufacturing of business forms, it is often desirable to produce a form that contains a hang tag that can be removed and suspended from another surface. For example, the Department of Motor Vehicles for a state may need a form that contains a disabled or handicap parking permit, which can be removed from the form and suspended from a recipient's rear view mirror in his automobile.

Typically, hang tag forms are separately manufactured and mailed to a recipient in an envelope along with an informational or instructional letter from the sender. Mailing an envelope filled with a hang tag and an instructional letter increases the weight of the mailing, which increases the costs associated with mailing the package.

In addition, hang tags are typically laminated to increase the durability of the hang tag and prolong its useful life. Typical laminates used to protect hang tags include a certain percentage of silicone. However, a silicone-based laminate is unable to support printing, such as laser printing, on the top of the laminated surface. Consequently, with some known laminated tags, any information or images have to be included or applied prior to the lamination process.

DETAILED DESCRIPTION

Figure 1:
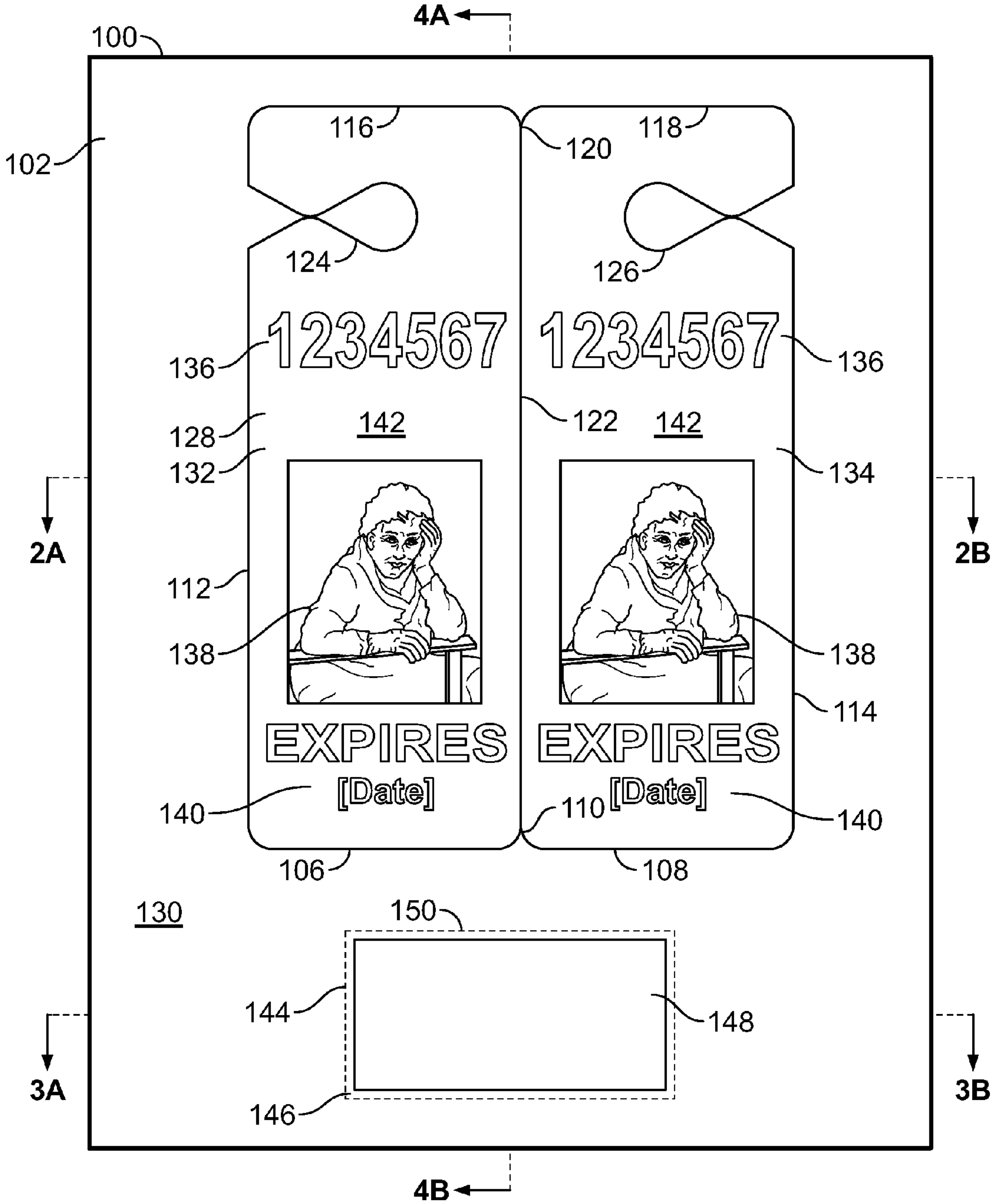
FIG. 1 is a plan view of an example substrate having a removable hang tag assembly.

The following examples describe forms that include features such as, for example, removable hang tags, removable hang tags with confidentiality shields, and removable hang tags with security devices. The examples described herein may include a heavy paper that is printable via regular ink jet printers, laser printers, thermal printers or the like and, therefore, do not require complex industrial machinery for printing. Thus, the example forms described herein are printable and configured to be personalized at, for example, a point of purchase such as, for example, a local department of motor vehicles. Unlike traditional tags of a single construction with preprinted information and control numbers, the example tags described herein are customizable and able to be personalized. The example tags described herein allow lower inventory control, ease of use and higher security with respect to the issuance of the tags.

In some examples, an example form includes a substrate having a first face and a second face. The example form also includes a plurality of lines of weakness including, for example, a first line of weakness formed in the substrate, a second line of weakness formed in the substrate adjacent to the first line of weakness and coupled to the first line of weakness at a first junction, a third line of weakness formed in the substrate and coupled to the first line of weakness, a fourth line of weakness formed in the substrate and coupled to the second line of weakness, a fifth line of weakness formed in the substrate distal to the first line of weakness, and a sixth line of weakness formed in the substrate distal to the second line of weakness and coupled to the fifth line of weakness at a second junction. The example form may also include a fold line formed on the substrate between the first junction and the second junction. The first, second, third, fourth, fifth and sixth lines of weakness define a central area and a perimeter matrix and the fold line divides the central area into a first side and a second side.

Another example form includes a first substrate including a first line of weakness defining a central area and a perimeter area and a second line of weakness in the central area to divide the central area into a first side and a second side. The example form also includes a third line of weakness formed in the perimeter area to define a first sleeve layer. A second substrate is disposed over at least a portion of the first sleeve layer and coupled thereto via a first adhesive pattern. The second substrate forms a second sleeve layer.

In a further example, a form includes a substrate having a first line of weakness defining a central area and a perimeter area and a second line of weakness in the central area to divide the central area into a first side and a second side. The example form also includes a third line of weakness formed in the perimeter area defining a sleeve area and a fourth line of weakness formed in the sleeve area to divide the sleeve area into a first sleeve layer and a second sleeve layer.

Figure 2:
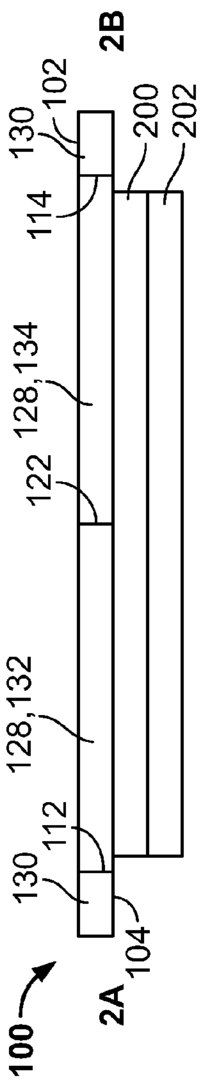
FIG. 2 is a cross-sectional view of the example form of FIG. 1 taken along the line 2A-2B.
Figure 3:
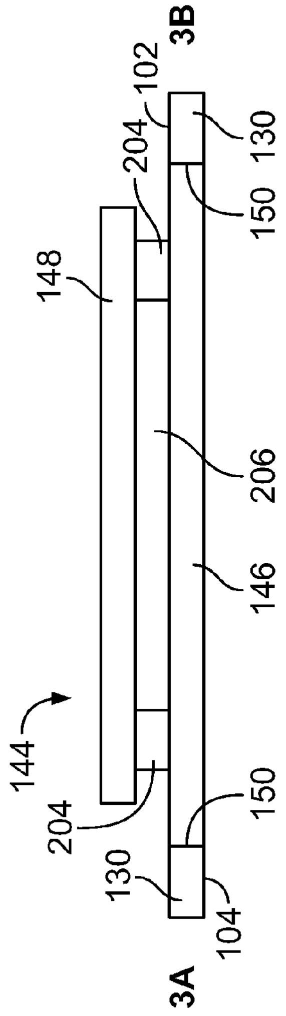
FIG. 3 is a cross-sectional view of the example form of FIG. 1 taken along the line 3A-3B.
Figure 4:
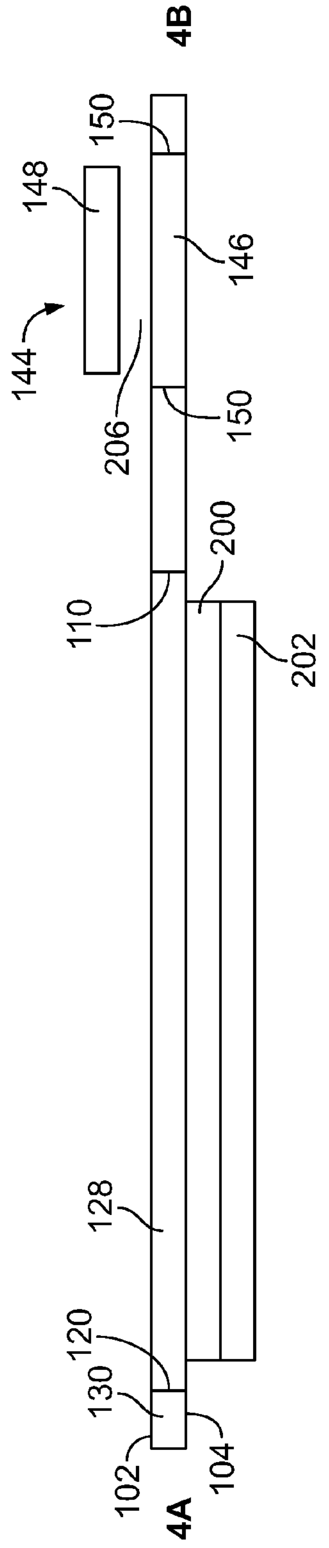
FIG. 4 is a cross-sectional view of the example form of FIG. 1 taken along the line 4A-4B.

Turning to the figures, FIG. 1 is a plan view of an example substrate 100 having a first face 102 and a second face 104 (FIGS. 2-4). The example substrate 100 may be a seven or ten mil white polyester substrate, another type of laser printable synthetic or paper material, vinyl, or any other suitable material. A plurality of lines of weakness are formed in the substrate 100 including a first line of weakness 106 and a second line of weakness 108, which is formed in the substrate 100 adjacent to the first line of weakness 106 and coupled to the first line of weakness 106 at a first junction 110. The example substrate 100 also includes a third line of weakness 112 that is coupled to the first line of weakness 106 and a fourth line of weakness 114 that is coupled to the second line of weakness 108. A fifth line of weakness 116 is formed in the example substrate 100 distal to the first line of weakness 106, and a sixth line of weakness 118 is formed in the example substrate 100 distal to the second line of weakness 108. The fifth line of weakness 116 and the sixth line of weakness 118 are coupled at a second junction 120. Another line of weakness, for example, a fold line 122 is formed on the example substrate 100 between the first junction 110 and the second junction 120.

The example substrate 100 also includes a seventh line of weakness 124 and an eighth line of weakness 126. The seventh line of weakness 124 is adjacent the third line of weakness 112 and the fifth line of weakness 116. The eighth line of weakness 126 is adjacent the fourth line of weakness 114 and the sixth line of weakness 118.

In these examples, the lines of weakness may be, for example, a perforation, a die-cut, a kiss-cut, a fold, or any other type of line of weakness or combination thereof. In addition, the lines could include indicia outlining a fold or a line for scissors any other cutting instrument to cut (for the purposes of this description, these lines/indicia will be considered "lines of weakness"). Furthermore, as shown in FIG. 1, one or more of the first, second, third, fourth, fifth, sixth, seventh or eighth lines of weakness may be integral.

The lines of weakness define a central area 128 and a perimeter matrix 130. The fold line 122 divides the central area 128 into a first side 132 and a second side 134. One or more of the first side 132 or the second side 134 of the central area 128 include variable indicia. The indicia could include, for example, a serial number 136, personalized information including a name, address, identification number or picture 138, an expiration date 140, or an area 142 for adding (for example, via handwriting) other variable, personalized and/or confidential information.

The example substrate 100 also includes a slide or sleeve 144 formed in the perimeter matrix 130. The slide 144 includes a first slide or sleeve layer 146 and a second slide or sleeve layer 148. An additional line of weakness 150 is formed in the perimeter area 130 to define the first sleeve layer 146. A second substrate is disposed over at least a portion of the first sleeve layer 146 and coupled thereto via an adhesive pattern (FIG. 3) to form the second sleeve layer 148. As described in greater detail below, the slide 144 can be used to cover the confidential and/or personal information 138, 142 in the central area 128. In some examples, the second sleeve layer 148 may be formed in the example substrate 100, removed therefrom and coupled to the first sleeve layer 146.

FIGS. 2-4 are cross-sectional views of the example substrate 100 of FIG. 1. As shown in FIG. 2, the example substrate 100 is coupled to an adhesive layer 200 at the second face 104 of the substrate 100. The adhesive layer 200 may be a series of dots, strips, a continuous layer of adhesive or any suitable pattern. In addition, the adhesive layer 200 may be disposed fully within the central area 128, contiguous with the boundaries of the central area 128 or in any suitable configuration. Coupled to a side of the adhesive layer opposite the substrate 100 is a release liner 202. The release liner 202 covers the adhesive layer 202 while, for example, the substrate 100 is shipped, printed, etc.

FIG. 3 is a cross-sectional view of the slide 144. In the example of FIG. 3, the first slide layer 146 is coupled to the second slide layer 148 via two adhesive layers 204. Between the two adhesive layers 204 and the first slide layer 146 and the second slide layer 148, a slide blocking area 206 is formed.

Figure 5:
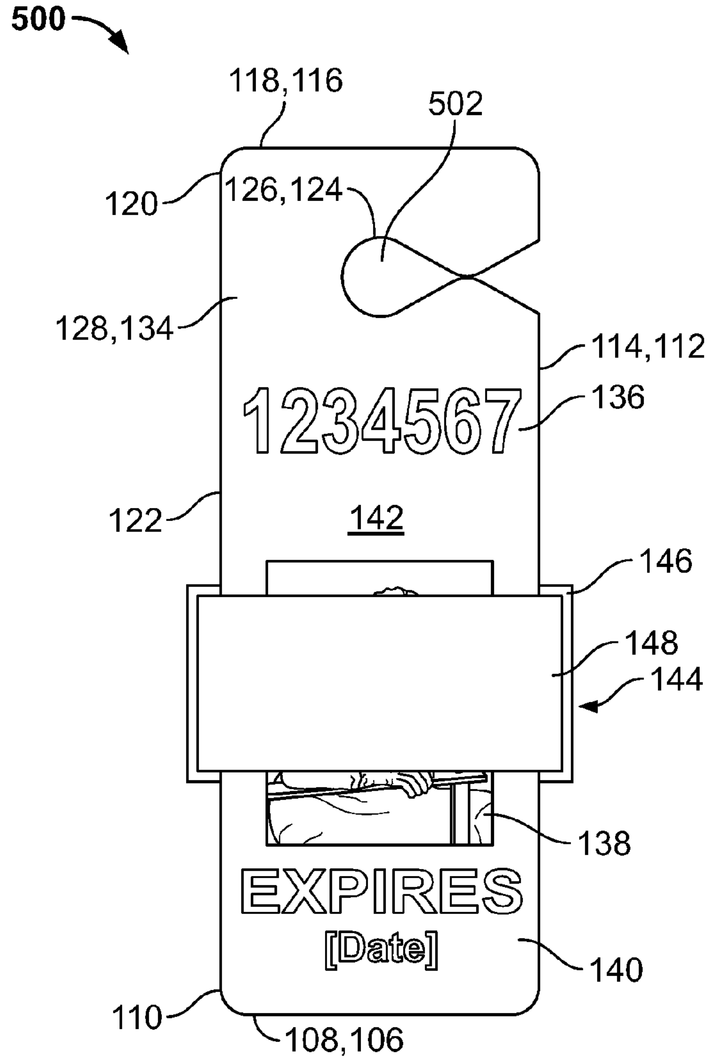
FIG. 5 is a plan view of the example hang tag assembly of FIG. 1.

FIG. 5 is a plan view of an example hang tag form assembly 500 formed from the substrate 100 of FIGS. 1-4. The first through sixth lines of weakness 106, 108, 112, 114, 116, 118 are used to separate the central area 128 from the perimeter matrix 130. The seventh and eighth lines of weakness 124, 126 may also enable separation of the central area 128. The liner 202 is removed, and the central area 128 is folded about the fold line 122. In this example, the fold line 122 does not enable full separation of the first side 132 and the second 134. Rather, the fold line 122 maintains the first side 132 and the second side 134 in a coupled relationship, while allowing the first side 132 and the second 134 to be folded in an opposed relationship so that the second face 104 of the first side 132 is coupled via the adhesive 200 to the second face 104 of the second side 134 to form a double layered form or hang tag.

When the central area 128 is folded about the fold line 122, the first line of weakness 106 substantially aligns with the second line of weakness 108, the third line of weakness 112 substantially aligns with the fourth line of weakness 114, the fifth line of weakness 116 substantially aligns with the sixth line of weakness 118, and the seventh line of weakness 124 substantially aligns with the eighth line of weakness 126.

The seventh line of weakness 124 and the eighth line of weakness 126 form a removable portion that is removed to create an opening 502 for suspending the form 500 from a surface such as, for example, an interior rear view mirror of a vehicle, by slipping a portion of the rear view mirror through the opening or hole 502 created by the removal of the removable portion. In the example of FIG. 5, the opening 502 extends to an outer edge of the central area 128. In addition, as shown in the example of FIG. 5, the removable portion and, thus, the opening 502, is in the form of a circle, a diamond, a triangle, a tear drop, a key hole or a combination thereof. The removable hang tag 500 in the example shown in the figures may be used as a temporary disabled parking permit, though the hang tag 500 can be any other type of hang tag and, thus, may contain any other desired information.

As shown in FIG. 5, the central area 128 when folded into the double layer hang tag 500 is insertable into the slide blocking area 206 between the first slide layer 146 and the second slide layer 148. The length of each of the first slide layer 146 and the second slide layer 148 and of the slide blocking area 206 is more than half of the central area 128, i.e., more than the width of each of the first side 132 and the second side 134. This enables the central area 128 to be slidably and removably coupled to the sleeve 144. The slidable sleeve 144 enables the recipient of the form 500 to cover confidential or personal information including, for example, his or her name and/or photograph. This feature provides added comfort to the recipient of the form 500 because he or she can block his or identity as, for example, a vehicle owner, from persons with mal-intent, or otherwise to maintain his or her privacy.

Figure 6:
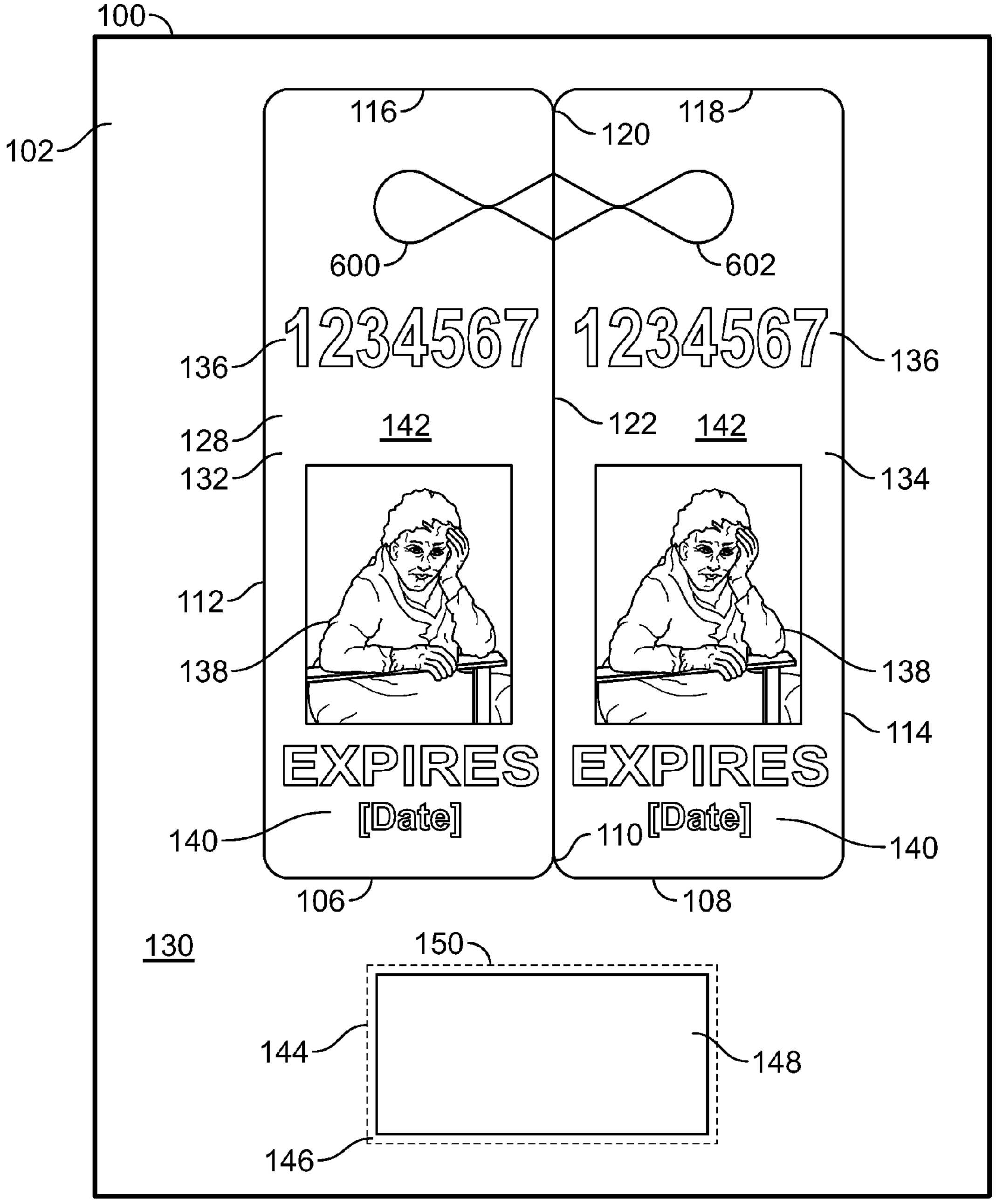
FIG. 6 is a plan view of an example substrate having an alternative example hang tag assembly.

FIG. 6 shows the example substrate 100 with alternative lines of weakness. In this example, a seventh line of weakness 600 and eighth line of weakness 602 is formed in the substrate 100. The seventh line of weakness 600 and the eighth line of weakness 602 may be integral. The seventh line of weakness 600 and the eighth line of weakness 602 are not directly coupled to any of the first through sixth lines of weakness. In other respects, the seventh line of weakness 600 and the eighth line of weakness 602 have substantially the same features and functionality of the other lines of weakness described above.

Figure 7:
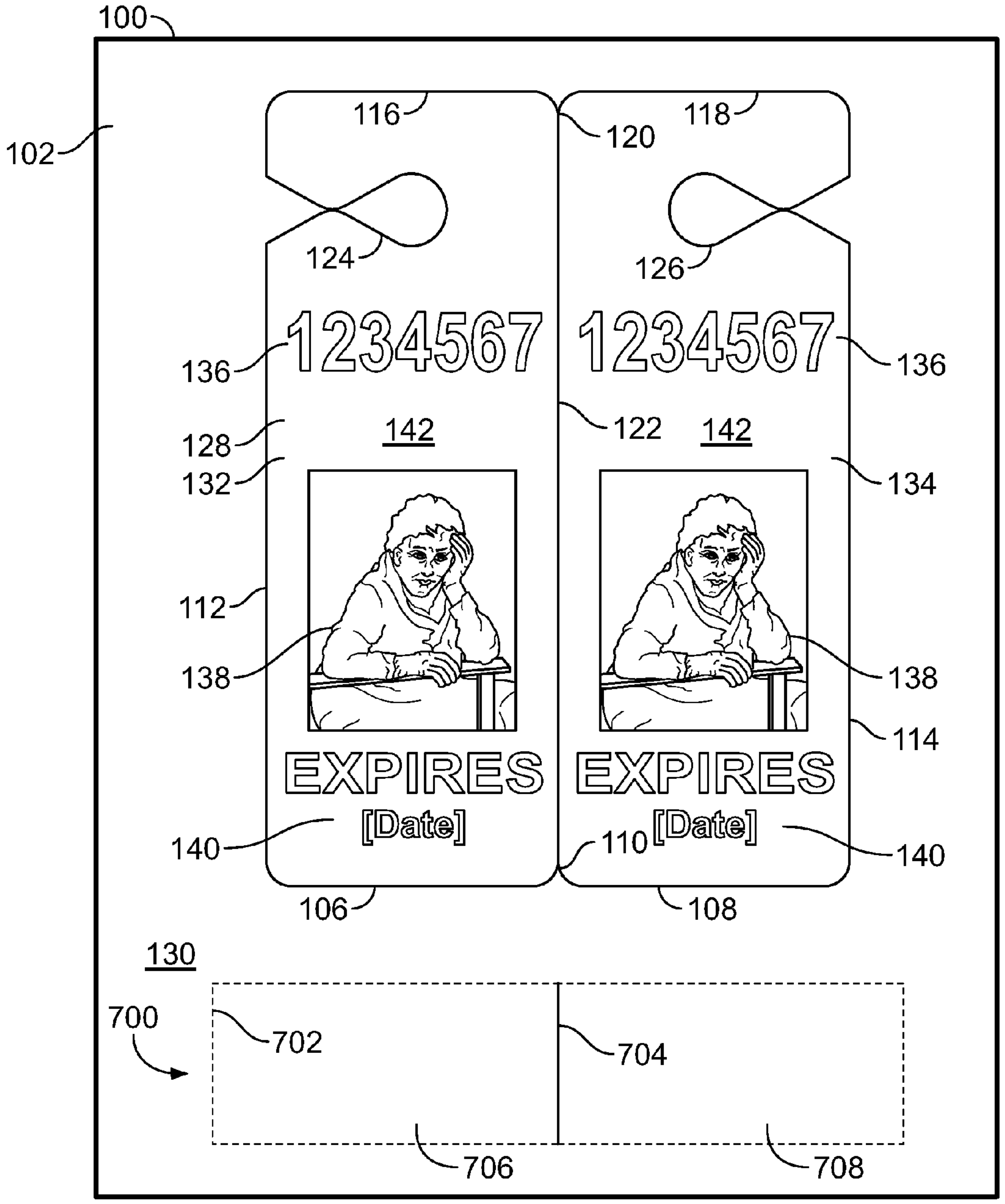
FIG. 7 is a plan view of an example substrate having another alternative example hang tag assembly.

FIG. 7 shows the example substrate 100 with an alternative example sleeve 700. The example substrate 100 includes a first additional line of weakness 702 that forms the sleeve 700. Within the perimeter of the first additional line of weakness 702 is a second additional line of weakness 704. The second additional line of weakness 704 separates or divides the sleeve 700 into the first sleeve layer 706 and the second sleeve layer 708.

When the first additional line of weakness 702 is used, activated or otherwise broken, the sleeve 700 is separated from the perimeter matrix 130. The sleeve 700 is foldable about the second additional line of weakness so that the first sleeve layer 706 and the second sleeve layer 708 overlap or are in an opposed relationship. The first sleeve layer 704 and the second sleeve layer 706 are then coupled via an adhesive similar to that described above in FIGS. 1-4. In other respects, the sleeve 700 has the substantially the same features and functionality of the other sleeves described above.

Figure 8:
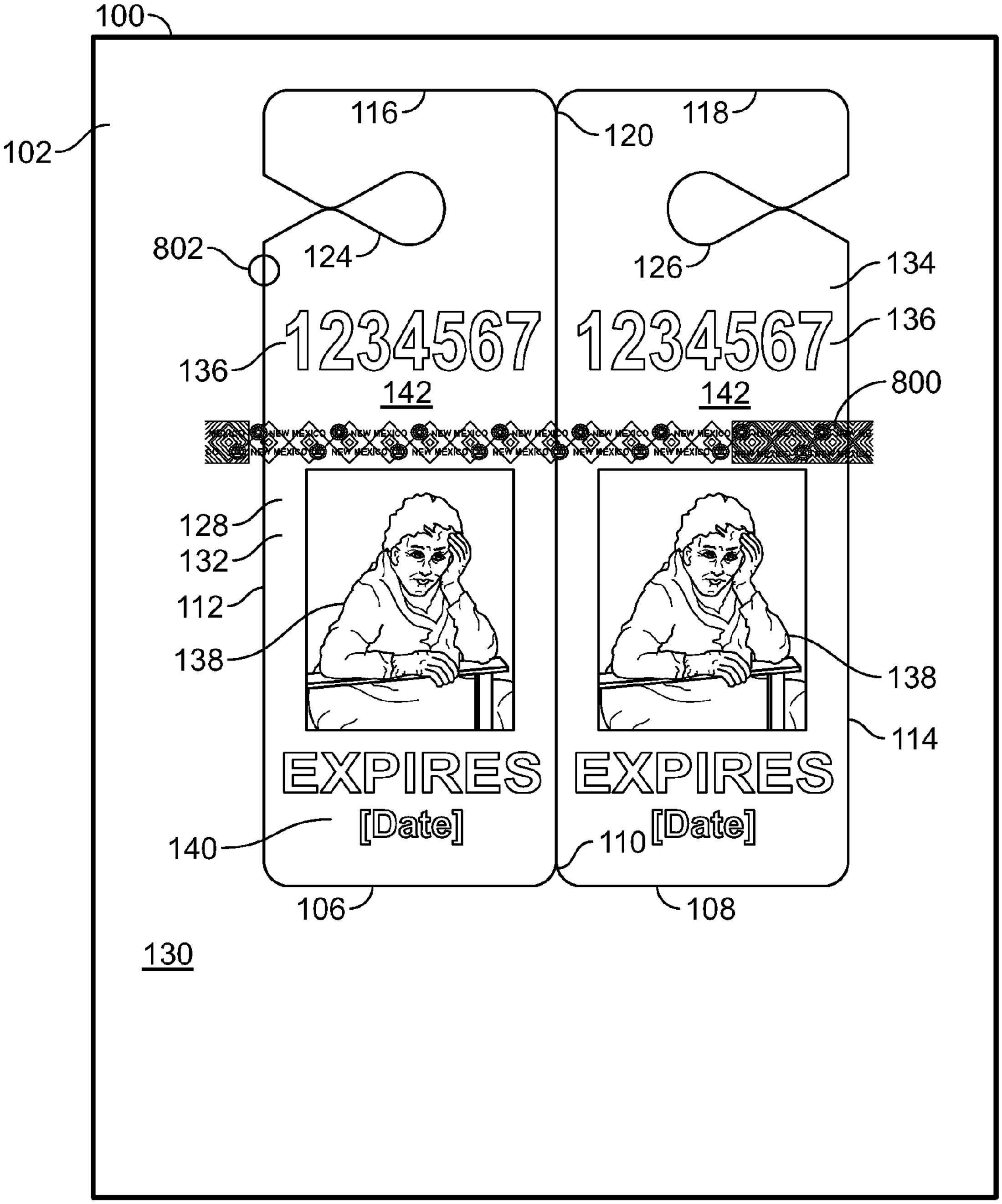
FIG. 8 is a plan view of an example substrate having another alternative example hang tag assembly.

FIG. 8 shows the example substrate 100 with an example security marking 800. The security marking 800 of the illustrated example is a strip of metallic material with holographic details. However, the security marking 800 may be any type of security feature(s) including, for example, hologram(s), microprinting, pantograph(s), barcode(s), color shifting ink (s) or any combination thereof. The security marking 800 can be used to authenticate and/or validate the hang tag form.

The example of FIG. 8 also includes one or more tab(s) 802. In this example, the tab 802 is coupled to the first face 102 of the first side 132, and when the central area 128 is folded about the fold line 122, the tab 802 is may be coupled to the first face 102 of the second side 134 to couple the second face 104 of the first side 132 and the second face 104 of the second side 134 in an opposed configuration to create the double layer hang tag 500. The tab(s) 802 may be used in addition or as an alternative to the adhesive layers 200, 204 that couple the first side 132 and the second side 134 of the central area 128 and the first sleeve layer 146, 706 with the second sleeve layer 148, 708.

Other features of hang tags such, as for example, the hang tag described in U.S. patent application Ser. No. 11/401,590, which was filed on Apr. 11, 2006, which issued as U.S. Pat. No. 7,748,602 on Jul. 6, 2010, and which is entitled, "Forms Containing Removable Hang Tags and Methods of Producing the Same," which is hereby incorporated by reference in its entirety, may be combined with or used in place of features described herein.

One example method of forming one of the example hang tags (e.g., the hang tag 500) described herein includes printing and/or writing information (e.g., variable indicia 142, a serial number 136, personalized information including a name, address, identification number or picture 138, an expiration date 140). The example method also includes activating or breaking the lines of weakness to separate or disassociate the central area 128 from the perimeter matrix 130. The example method also includes removing the liner 202 and folding the central area 128 about the fold line 122. The first side 132 and the second side 134 of the central area 128 are coupled to each other in an opposed relationship by the adhesive layer 200. The removable portion defined by lines of weakness 124, 126, 600, 602 is removed to create the opening or aperture 502.

The slide or sleeve 148 is punched out (i.e., the line of weakness 150 is activated) to separate the sleeve 148 from the matrix perimeter 130. The central area 128, which has been folded into a double layer subform or hang tag 500, is insertable into the sleeve or slide blocking area 206. The sleeve 148 is slidably and removably coupled to the hang tag 500.

In other examples of creating the hang tag assemblies described herein, the sleeve 700 is punched out from the substrate 100 and folded about the line of weakness 704. Adhesive or tabs are used to couple the first sleeve area 706 with the second sleeve area 708 to form a double layer structure with a sleeve or slide blocking area 206. The example hang tag 500 is removably and slidably coupled thereto.

With the sleeve 144, 700 coupled to the hang tag 500, a user can adjust the position of the sleeve to selectively cover or expose any portion of the hang tag 500. Thus, for example, an elderly user could position the sleeve 144, 700 over their picture 138 to avoid revealing their identity to anyone passing by the vehicle in which the hang tag 500 is positioned, making the user feel less vulnerable to crime. In addition, the user can remove the sleeve 144, 706 from the hang tag 500 or slide it down to reveal their photograph 138, or other identifying indicia, to prove to, for example, a police officer or parking attendant, the validity of the hang tag form 500.

An example method of manufacturing the example substrates 100 described herein includes die-cutting lines of weakness such as, for example, one or more of the first through eighth lines of weakness 106, 108, 112, 114, 116, 118, 124 and 126 and the additional line of weakness 150 into the substrate 100. The example method also includes adding the adhesive layer 200 to the second face 104 of the substrate 100 and coupling the release liner 202 to the substrate 100 over the adhesive layer 200. In addition, the second substrate, i.e., the second sleeve layer 148, is coupled to the second layer of adhesive 204 over the portion of the substrate 100 delimited by the additional line of weakness 150.

In alternative examples of manufacture, tabs may be coupled to the substrate or provided with the substrate in addition to or in place of the adhesive layers. Furthermore, in some example methods of manufacture, the second sleeve layer 708 is formed in the substrate 100 adjacent to the first sleeve layer 706. In addition, the first sleeve layer 706 and the second sleeve layer 708 could be formed anywhere in the substrate 100, not necessarily next to each other.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A form comprising:

a first substrate including a first line of weakness defining a central area of the form and a perimeter area of the form surrounding the central area, a second line of weakness in the central area to divide the central area into a first side and a second side, and a third line of weakness formed in the perimeter area and defining a first sleeve layer; and a second substrate disposed over at least a portion of the first sleeve layer and coupled thereto via a first adhesive pattern, the second substrate forming a second sleeve layer, the first sleeve layer and the second sleeve layer form a sleeve, the central area to be slidably disposable within the sleeve to at least partially cover the central area.

2. A form as defined in claim 1 further comprising a fourth line of weakness formed in the first substrate layer to define a removable portion of the central area.

3. A form as defined in claim 2, wherein the fourth line of weakness comprises two sets of perforations.

4. A form as defined in claim 1, wherein the second line of weakness is a fold line so the first side is not separated from the second side.

5. A form as defined in claim 4, wherein the central area is foldable about the second line of weakness to cause the first side and the second side to overlap.

6. A form as defined in claim 5, wherein the first side and the second side are coupled via one or more of an adhesive or a tab.

7. A form as defined in claim 1, wherein the central area is removable from the form and foldable about the second line of weakness to form a double-layer subform, wherein the first sleeve layer is removable from the form and with the second sleeve layer forms the sleeve that has a sleeve blocking area between the first sleeve layer and the second sleeve layer, and wherein the subform is insertable into the sleeve blocking area so the sleeve removably covers at least a portion of the subform.

8. A form as defined in claim 7, wherein the subform includes at least one of confidential or personal information and the sleeve is to removably cover the confidential or personal information.

9. A form as defined in claim 7, wherein the sleeve is configured to be slidably coupled to the subform.

10. A form as defined in claim 1, wherein the first sleeve layer and the second sleeve layer have lengths that are longer than one half of the length of the central area.

11. A form as defined in claim 1, wherein the first line of weakness comprises a score and the third line of weakness comprises a score or a perforation.

12. A form comprising:

a substrate including:

a first line of weakness defining a central area and a perimeter area surrounding the central area;

a second line of weakness in the central area to divide the central area into a first side and a second side;

a third line of weakness formed in the perimeter area to define a sleeve area; and a fourth line of weakness formed in the sleeve area to divide the sleeve area into a first sleeve layer and a second sleeve layer, the third line of weakness comprising a perforation and the fourth line of weakness comprising a score, the sleeve area is foldable about the fourth line of weakness to form a sleeve defining an opening between the first sleeve layer and the second sleeve layer, the opening sized to receive the central area after the first and second sides are folded about the second line of weakness.

13. A form as defined in claim 12, wherein the first sleeve layer and the second sleeve layer each have lengths longer than one half of the length of the central area.

14. A form as defined in claim 12, wherein the central area is foldable about the second line of weakness to form a subform.

15. A form as defined in claim 14 further comprising:

at least one of a first adhesive or a first tab to couple the first side and the second side in an opposed relation; and at least one of a second adhesive or a second tab to couple the first sleeve layer and the second sleeve layer in an opposed relation.

16. A form as defined in claim 14, wherein the subform and the sleeve are slidably couplable.

17. A form comprising:

a substrate having a first face and a second face, the substrate comprising a central area and a perimeter matrix that surrounds the central area;

a first line of weakness formed in the substrate;

a second line of weakness formed in the substrate adjacent to the first line of weakness and coupled to the first line of weakness at a first junction;

a third line of weakness formed in the substrate and coupled to the first line of weakness;

a fourth line of weakness formed in the substrate and coupled to the second line of weakness;

a fifth line of weakness formed in the substrate distal to the first line of weakness;

a sixth line of weakness formed in the substrate distal to the second line of weakness and coupled to the fifth line of weakness at a second junction;

a fold line formed on the substrate between the first junction and the second junction, wherein the first, second, third, fourth, fifth and sixth lines of weakness define the central area and the perimeter matrix and the fold line divides the central area into a first side and a second side; and a seventh line of weakness formed in the perimeter matrix to define a first slide layer, a second slide layer coupled to the first slide layer to form a slide blocking area between the first slide layer and the second slide layer.

18. A form as defined in claim 17, wherein when the first, second, third, fourth, fifth and sixth lines of weakness enable the central area to be separated from the perimeter area, and the central area is foldable about the fold line to form a double layered form.

19. A form as defined in claim 18 further comprising:

an adhesive layer having a first side and a second side, the first side of the adhesive layer coupled to at least a portion of the second face of the substrate; and a liner covering the second side of the adhesive layer, wherein the liner is removable and the central area is foldable about the fold line, and wherein the adhesive layer is to couple the second face of the first side with the second face of the second side to form the double layered form.

20. A form as defined in claim 18 further comprising tabs coupled to the first face of the first side and the first face of the second side to couple the second face of the first side and the second face of the second side in an opposed configuration.

21. A form as defined in claim 18, wherein when the central area is folded about the fold line, the first line of weakness substantially aligns with the second line of weakness, the third line of weakness substantially aligns with the fourth line of weakness, and the fifth line of weakness substantially aligns with the sixth line of weakness.

22. A form as defined in claim 17, wherein two or more of the first, second, third, fourth, fifth or sixth lines of weakness are integral.

23. A form as defined in claim 17 further comprising variable indicia.

24. A form as defined in claim 17, wherein the central area is slidably disposable within the slide blocking area.

25. A form as defined in claim 17 further comprising a security marking.

26. A form as defined in claim 25, wherein the security marking is one or more of a hologram, microprinting, a pantograph, barcode, or color shifting inks.

27. A form as defined in claim 17, further comprising an eighth line of weakness and a ninth line of weakness, wherein the eighth and ninth lines of weakness are coupled to the fold line and form a removable portion to be removed to create an opening for suspending the form.

28. A form as defined in claim 27, wherein the eighth line of weakness and the ninth line of weakness are not directly coupled to any of the first through sixth lines of weakness.

29. A form as defined in claim 27, wherein the two or more of the third, fourth, fifth, sixth, eighth or ninth lines of weakness are integral.

30. A form as defined in claim 27, wherein the removable portion is in the form of a circle, a diamond, a triangle, a tear drop, a key hole or a combination thereof.

31. A form as define in claim 27, wherein the first, second, third, fourth, fifth and sixth lines of weakness are used to separate the central area from the perimeter area, wherein at least an adhesive layer or one or more tabs couples the second face of the first side in an opposed relation to the second face of the second side to form a double layered form, and wherein the eighth and ninth lines of weakness substantially align.

32. A form as defined in claim 27, wherein one or more of the first through ninth lines of weakness include perforations.

* * * * *